W. R. HEINITZ.
RECORDING MECHANISM FOR CASH REGISTERS.
APPLICATION FILED JULY 15, 1912.

1,094,561.

Patented Apr. 28, 1914.

3 SHEETS—SHEET 2.

W. R. HEINITZ.
RECORDING MECHANISM FOR CASH REGISTERS.
APPLICATION FILED JULY 15, 1912.
1,094,561.
Patented Apr. 28, 1914.
3 SHEETS—SHEET 3.
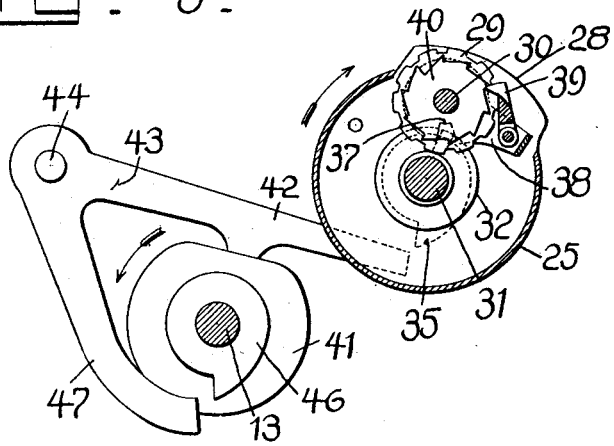
Fig. 3.
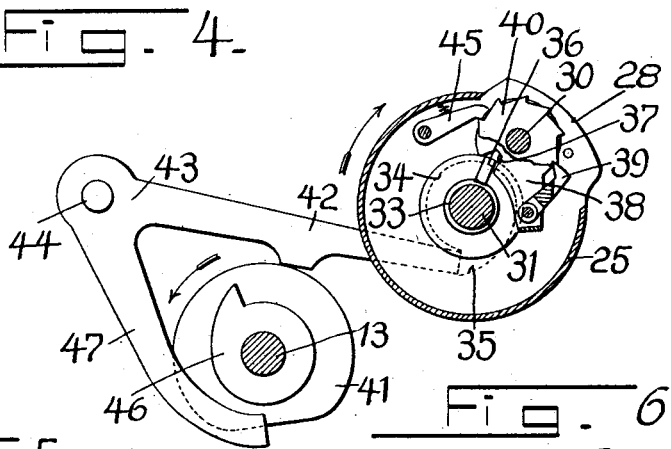
Fig. 4.
Fig. 5.
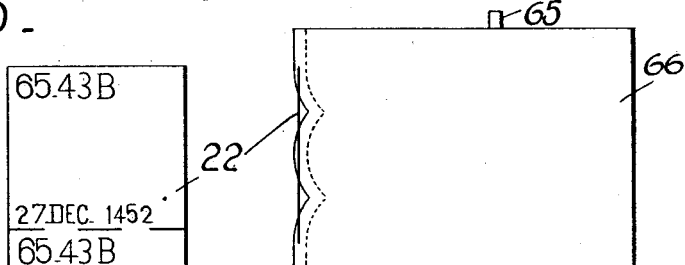
Fig. 6.
Witnesses
C. Klostermann
W. M. McCarthy
Inventor
Woldemar Reinbold Heinitz
by R. Ohlau
C. H. Braselton
Attorney
COLUMBIA PLANOGRAPH CO., WASHINGTON, D. C.

UNITED STATES PATENT OFFICE.

WOLDEMAR REINHOLD HEINITZ, OF CHEMNITZ, GERMANY, ASSIGNOR TO THE NATIONAL CASH REGISTER COMPANY, OF DAYTON, OHIO, A CORPORATION OF OHIO, (INCORPORATED IN 1906.)

RECORDING MECHANISM FOR CASH-REGISTERS.

1,094,561.  Specification of Letters Patent.  Patented Apr. 28, 1914.

Application filed July 15, 1912. Serial No. 709,412.

*To all whom it may concern:*

Be it known that I, WOLDEMAR REINHOLD HEINITZ, a citizen of the Kingdom of Saxony, residing at Chemnitz, Germany, have invented certain new and useful Improvements in Recording Mechanism for Cash-Registers, of which I declare the following to be a full, clear, and exact description.

This invention relates to cash registers and more particularly to the recording mechanism thereof.

The principal object of this invention is to provide mechanism for issuing what is known in the art as stub checks, that is, checks upon which duplicate impressions are made, the said checks being weakened by perforating or partially severing same between the impressions so that the portions of the checks may easily be separated. These stub checks are of particular value in establishments wherein they have what is known as the "pay cashier" system, as one portion of the check may be retained by the customer as a receipt while the other portion of the check is handed to the cashier with the amount of the purchase.

Another object of this invention is to provide an improved mechanism for weakening the checks between the impressions, which is accomplished by partially severing the checks instead of perforating said checks as has been done heretofore.

Another object of this invention is to provide an improved numbering device whereby the different operations of the issued checks may have recorded thereon the same identifying number.

With these and incidental objects in view, the invention consists in certain novel features of construction and combinations of parts, the essential elements of which are set forth in appended claims, and a preferred form of embodiment of which is hereinafter described with reference to the drawings which accompany and form part of this specification.

Figure 1:
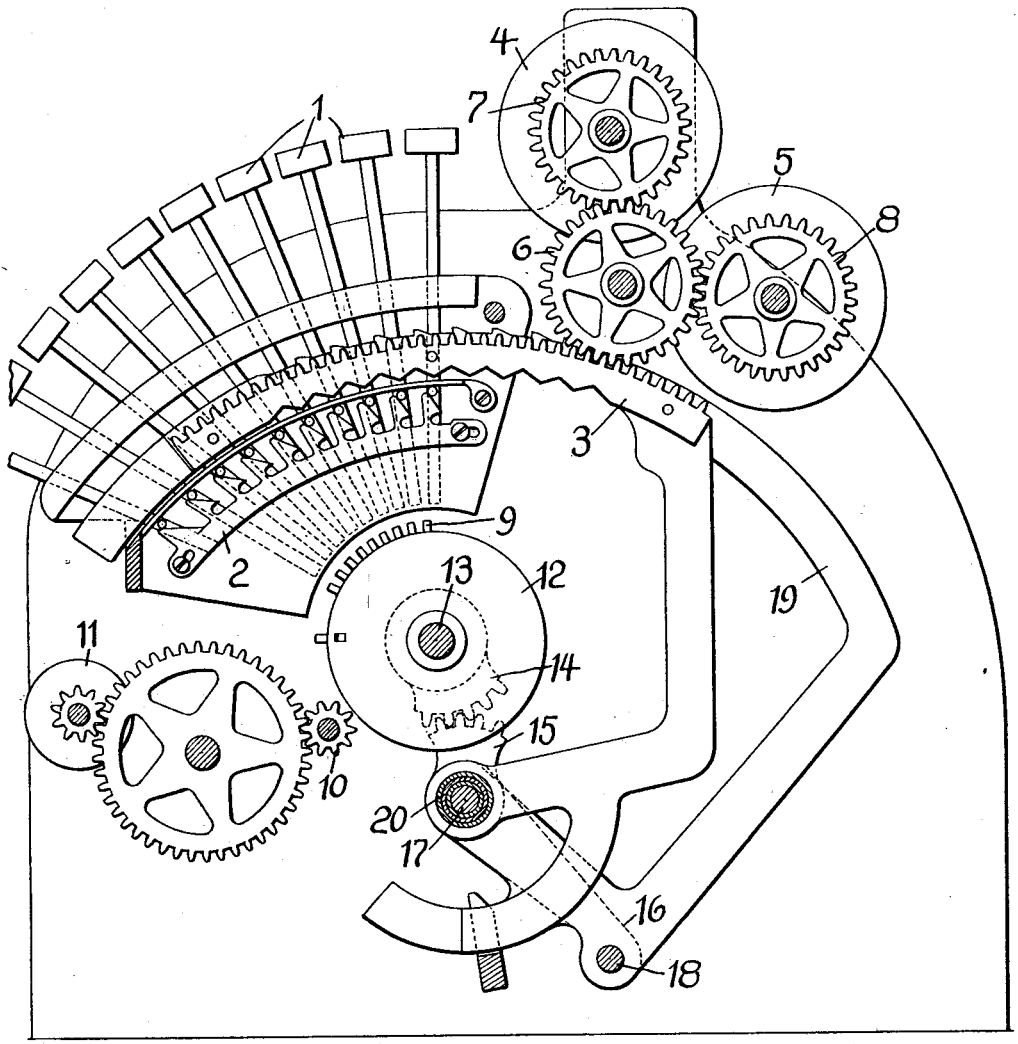
Figure 2:
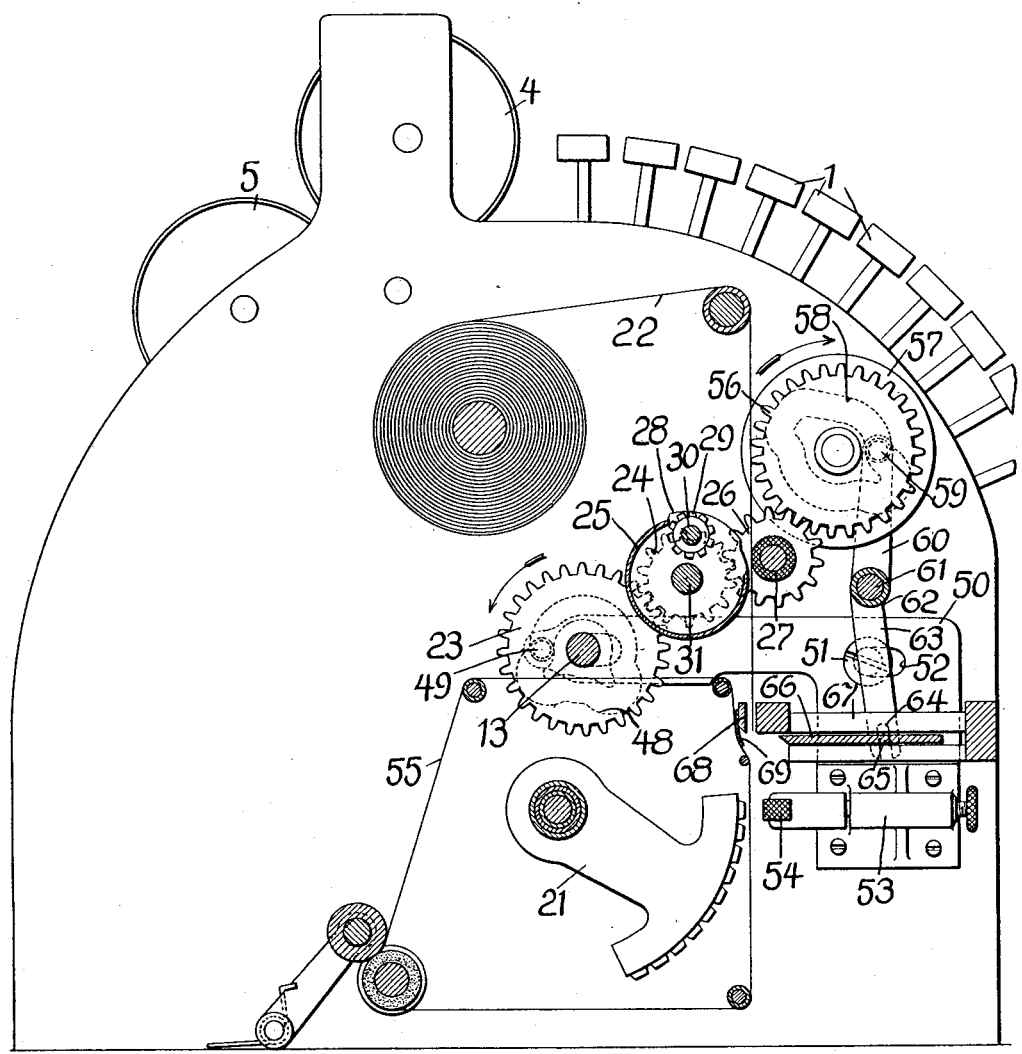

Figure 1 is a transverse sectional view through a machine of a well known type to which this invention has been shown applied. Fig. 2 is an end elevation partly in section, showing the improved check issuing mechanism. Figs. 3 and 4 are detail views of the consecutive numbering device and coöperating parts. Fig. 5 is a plan view of one of the checks as issued by the machine. Fig. 6 is a plan view of the knife for severing the check.

For the sake of illustration, this improvement has been shown applied to a machine of a type shown in Patent No. 875,075, granted December 31, 1907 and in application Serial No. 429,651, filed April 28, 1908, by the present applicant, but it is to be understood that this invention is not limited to this particular style of machine, but may, with equal facility, be applied to any of the other well known machines now upon the market.

The style of machine to which this invention has been shown applied is provided with a plurality of banks of amount keys 1, which, when depressed, are latched in their innermost position by a detent 2, coöperating with each bank of keys. These keys control a differential movement of an actuator 3, which will drive the front and back indicators 4 and 5 respectively through the gears 6, 7 and 8. The keys 1 are also arranged to project teeth 9 into the path of a pinion 10 which is connected by suitable gearing to one of the totalizer elements 11. The teeth 9 are mounted in a disk 12, of which there is one for each bank of amount keys and these disks are secured to the main operating shaft 13, which receives a complete rotation upon each operation of the machine. The teeth 9 of which disk 12 are normally out of plane of movement of the pinions 10, but upon depressing one of the amount keys and operating the machine, a number of these teeth, corresponding to the value of the key depressed, will be projected into the same plane as the pinions 10 are located so that as the disk 12 continues in its rotation, the projected teeth will engage the pinion 10 and rotate said pinion a distance corresponding to the key depressed, which movement will be transferred to the totalizer element 11, through the intervening gearing shown in Fig. 1. This construction is well known in the art and it is thought needs no further description.

Near each end of the shaft 13, there is attached thereto a segment 14, which normally engages with segments 15 projecting from arms 16, which arms are suitably supported upon a transverse shaft 17 and are connected at the extreme lower ends by a cross rod 18. Adjacent to each of the actuators 3 is a driving element 19 therefor, which elements are pivotally mounted upon nested sleeves 20. Surrounding the shaft 17 and extending through these driving elements is a bar 18 from which it will be seen that these driving elements are moved in unison with the arms 16 in which the rod 18 is supported. The connection between the driving elements 19 and the actuators 3 is fully shown and described in the aforementioned patent and it is thought that no further description of same need be given, it being sufficient to state that the driving elements 19 are given a positive reciprocatory movement during each operation of the machine while the actuators 3 are differentially adjusted thereby depending upon the keys depressed.

The nested sleeves 20 which surround the shaft 17 are connected at their inner ends to the actuators 3 and at their outer ends are connected to segmental type carriers 21, Fig. 2, from which it will be seen that the differential adjustments of the actuators 3, will be conveyed to the type carriers 21, which are left in their adjusted positions at the end of the operation of the machine and are returned to their normal or zero position upon the beginning of the succeeding operation of the machine by the cross rod 18.

A check strip 22 is arranged to be fed in position to have duplicate impressions taken thereon from the type carriers 21 and to be partially severed between the impressions and wholly severed after the impressions during a single operation of the machine.

That portion of the shaft 13 extending into the recording mechanism, is provided with a gear 23, which meshes with a gear 24 secured to a feed roller 25, which is in the form of a hollow cylinder. The gear 24 meshes with a similar gear 26, to which is secured a feed roller 27. The roller 25 is provided with a raised portion 28, which, during the rotation of the roller 25, will engage with the roller 27 and thereby feed the check strip 22 into position to have an impression taken thereon from the type carriers 21.

Consecutive numbering wheels 29 are mounted upon a shaft 30 supported within the roller 25, (Figs. 2, 3 and 4). One type of each of the wheels 29 is flush with the outer surface of the raised portion 28 of the roller 25 so that as the check strip 22 is fed by the raised portion 28, impinging against the roller 27, a number will be printed upon the check strip at each rotation of the drum 25.

As previously stated, the main shaft 13 is given a complete rotation upon each operation of the machine and gear 23 secured to this shaft is twice the size of the gear 24 secured to the drum 25 from which it will be seen that the said drum is rotated twice upon each operation of the machine and thereby record upon the check strip two numbers upon different portions of the check, which for the purpose hereinafter described are identical.

The feeding mechanism for the consecutive numbering device is operated by the rotation of the drum 25, but as it is the principal object of the invention to issue a stub check, the different portions of which have recorded thereon the same data, it becomes necessary to so construct the feeding device for the consecutive numbering mechanism that the said feed device will only be operated upon alternate rotations of the drum 25. The preferred form of mechanism for accomplishing this purpose will now be described.

The cylinder 25 is loosely mounted upon a stub shaft 31 projecting from one of the side frames of the machine. Also mounted upon this stub shaft 31 is a disk 32, Figs. 3 and 4, which is located within the cylinder 25 and frictionally held in engagement with said cylinder by suitable means so that normally, when the cylinder is rotated, this disk 32 will be rotated also. A sleeve 33, surrounding the stub shaft 31 has the disk 32 secured to its inner end while the outer end of said sleeve, which projects through one of the side walls of the cylinder 25 has secured thereto a disk 34 with a locking projection 35. The disk 32 has a lateral projection 36, which normally rests in a recess 37 formed in an arm 38 as shown in Fig. 3 of the drawing. The arm 38 has pivotally mounted thereon a multi-prong pawl 39, which coöperates with ratchet wheels 40 secured to consecutive numbering wheels 29.

During the first rotation of the drum 25, all of the above described parts move as a unit, but during the second rotation of said cylinders, the disk 32 is held from rotation, which causes the arm 38, carrying the multi-prong pawl 39 to be reciprocated and thereby feed the units wheel of the consecutive numbering device one step to bring a new number in printing position. The mechanism for holding the disk 32 from rotation during the second rotation of the cylinder 25 is as follows:—

Secured to the shaft 13 is a cam disk 41, with which coöperates a prong 42 of a forked member 43 which is pivotally mounted upon a stud 44, projecting from one of the side frames of the machine. The forward end of the prong 42 is arranged to coöperate with the locking projection 35 of the disk 34, but normally is out of coöperative relation therewith, so that during the first rotation of the cylinder 25, the disks 32 and 34 will rotate therewith. Immediately upon the beginning of rotation of the cylinder 25 the locking projection 35 will be carried away from the forward end of the prong 42, so that said prong may be lifted into the path of said locking projection, which is accomplished by the cam 41 secured to the shaft 13 and which position is fully illustrated in Fig. 4 of the drawings. As previously stated, the shaft 13 receives one rotation only, while the cylinder 25 receives two rotations upon each operation of the machine and from the shape of the cam 41, it will be seen that the forward end of the prong 42 will be held in engagement with the projection 35 during the second rotation of the drum 25, it being recalled that the disks 32 and 34 are held frictionally in engagement with the cylinder 25 so that said cylinder may be rotated independently of the disks after the latter are locked from rotation. As the cylinder rotates upon its second rotation the lateral offset 36 will cam the arm 38, carrying the multi-prong pawl 39 into the position shown in Fig. 4 of the drawings and near the end of the second rotation of the cylinder 25 the forward side wall of the recess 37 formed to the arm 38 will engage with the offset 36 and thereby cause the arm 38 to be restored to the position shown in Fig. 3, by which movement the pawl 39 will advance the units numbering wheel 29 one step. Retaining pawls 45 engage the ratchets 40 so as to hold the consecutive numbering wheels 29 in their adjusted position. These pawls are mounted in the cylinder 25 and are spring pressed into engagement with the wheels 40. It is of course understood that the transfer between the wheels of the consecutive numbering device may be of any well known form, that shown being of the deep-notch variety.

Mounted adjacent to the cam disk 41 secured to the shaft 13 is another cam disk 46 which at the proper time coöperates with a prong 47 of the member 43 so as to restore the prong 42 of said member into the position shown in Fig. 3. This engagement of the cam disk 46 with the prong 47 occurs at the very end of the rotation of the shaft 13.

Immediately after each feeding movement imparted to the check strip 22, an impression is taken upon said strip from the adjusted type carriers 21 and this impression mechanism is operated in the following manner.

The gear 23, Fig. 2, is provided with a cam race 48 in which plays a roller 49 projecting from a rearward extension of a slide 50, which slide is supported upon one of the side frames of the machine by the shaft 13 and a stud 51, which projects through elongated slots 52 in said slide. At its lower end the slide is provided with an offset 53 which carries a platen 54. The configuration of the cam race, formed in the gear 23, is such that the platen 54 is reciprocated twice to take an impression upon the check strip from the adjusted type carriers, it being understood that the check strip is fed by the rollers 25 and 27 previous to the first and second impressions. An ink ribbon 55 is suitably guided around the type carriers 21 so as to make more legible the impressions upon the check strip.

The next feature of the invention to be described relates to the means for weakening the check strip between the impressions and for severing the printed check from the remaining portion of the strip. While it is not broadly new to provide mechanism for perforating the check strip between duplicate impressions and then to sever the printed check, yet as far as applicant is aware, he is first in the art to provide a single means for performing this function and he wishes to be understood as claiming the same broadly without regard to the specific mechanism employed.

The pinion 26, Fig. 2, to which is secured the feed roller 27, meshes with a gear 56, which is the same size as the gear 23, secured to the shaft 13, so that upon each rotation of the shaft 13, the gear 56 also will be given a complete rotation. This gear 56 has attached thereto a disk 57, which is provided with a cam groove 58, in which plays a roller 59 projecting from the upper end of an arm 60, the latter being loosely mounted upon a stub shaft 61. At its center this arm 60 carries a sleeve 62 surrounding the shaft 61 and extending downwardly from this sleeve is a pair of arms 63, only one of which is shown. Each of these arms at its lower end is provided with a recess 64 in which projects a pin 65 extending from each side of a knife 66, Fig. 6. This knife 66 is guided in its movements by ribs 67, Fig. 2, suitably mounted upon the machine casing. The shape of the cam groove 58 in the disk 57 is such that upon each rotation of the disk two reciprocatory movements of different degrees will be imparted to the knife, the first movement of which partially severs the check strip, while the last movement wholly severs the check. The knife 66 is arranged to coöperate with a stationary knife 68 suitably supported upon the machine casing. This stationary knife, has projecting downwardly therefrom a sheet metal plate 69 which protects the ribbon 55 from the knife 66. From Fig. 6 it will be seen that the cutting edge of the knife 66 is scalloped, by which means it is possible to weaken the check between the impression, as shown in Fig. 5, by partially severing it so that the different portions of said check may be readily detached after the check has been wholly severed by the second movement of the knife 66.

It is to be understood that, while applicant has shown type carriers having a single set of type from which successive impressions are taken, he is not to be limited to this precise construction, but by some of the claims it is intended to cover constructions employing a double set of types whereby duplicate impressions may be taken simultaneously and the check weakened between the impressions at the same time said impressions are being made or subsequent to the time of taking said impressions.

While the form of mechanism herein shown and described is admirably adapted to fulfil the objects primarily stated, it is to be understood that it is not intended to confine the invention to the one form of embodiment herein shown and described as it is susceptible of embodiment in various forms all coming within the scope of the claims which follow.

What is claimed is:—

1. In a machine of the class described, the combination with a recording mechanism having means for taking a plurality of impressions upon a check strip, of an operating mechanism therefor, and a single means positively actuated by said operating mechanism for weakening the strip between the impressions and for severing the strip at a point beyond the rearmost impression.

2. In a machine of the class described, the combination with a recording mechanism having means for taking duplicate impressions upon a check strip, of an operating mechanism therefor, and a knife positively actuated by said operating mechanism for partially severing the strip between the impressions and for wholly severing said strip beyond the rearmost impression.

3. In a machine of the class described, the combination with an operating mechanism, of a type carrier differentially adjusted thereby, means for taking duplicate impressions upon a check strip from said type carrier, and a single means for partially severing the strip between the impressions and for wholly severing said strip after the last impression.

4. In a machine of the class described, the combination with an operating mechanism, of a type carrier differentially adjusted thereby, means for taking duplicate impressions upon a check strip from said type carrier and for feeding the strip between impressions, and a knife actuated by the operating mechanism for partially severing the strip between the impressions and for wholly severing said strip beyond the last impression.

5. In a machine of the class described, the combination with a differentially adjustable type carrier, of an operating mechanism, means actuated thereby for taking duplicate impressions upon a check strip from said type carrier, and a knife also actuated by the operating mechanism for partially severing the strip between the impressions and for wholly severing said strip beyond the last impression.

6. In a machine of the class described, the combination with a differentially adjustable type carrier, of an operating mechanism, means actuated thereby for taking duplicate impressions upon a check strip from said type carrier and for feeding the strip between impressions, and a knife actuated by the operating mechanism for partially severing the strip between the impressions and for wholly severing said strip beyond the last impression.

7. In a machine of the class described, the combination with a recording mechanism having means for taking a plurality of impressions upon a check strip, of an operating mechanism therefor, single means actuated by said operating mechanism for weakening the strip between the impressions and for severing the strip at a point beyond the rearmost impression, and means also actuated by the operating mechanism for numbering the weakened portions of the check strip.

8. In a machine of the class described, the combination with a type carrier, of an operating mechanism, means actuated thereby for taking duplicate impressions upon a check strip from said type carrier and feeding the strip between impressions, a knife for partially severing the strip between impressions and for wholly severing said strip beyond the last impression, and means also actuated by the operating mechanism for numbering the partially severed portions of the check strip.

9. In a machine of the class described, the combination with an operating mechanism, of a recording mechanism having means actuated by said operating mechanism during a single operation thereof for taking a plurality of similar impressions upon a check strip, means for weakening the strip between the impressions and for severing the strip at a point beyond the rearmost impression, and a single numbering device also actuated by the operating mechanism for listing the weakened portions of the strip with the same number for the purpose described.

10. In a machine of the class described, the combination with a differentially adjustable type carrier, of an operating mechanism, means actuated thereby for taking duplicate impressions upon a check strip from said type carrier and for feeding the strip between impressions, a knife for partially severing the strip between impressions and for wholly severing said strip beyond the last impression, and a single numbering device also actuated by the operating mechanism for listing the partially severed portions of the check strip with the same number for the purpose described.

11. In a machine of the class described, the combination with a differentially adjustable type carrier, of an operating mechanism, means actuated thereby for taking duplicate impressions upon a check strip from said type carrier and for feeding the strip between impressions, a knife for partially severing the strip between impressions and for wholly severing said strip beyond the last impression, a rotating cylinder having numbering wheels mounted therein for the purpose of listing the partially severed portions of the check, an actuator for the numbering wheels, and means controlled by the operating mechanism for preventing actuation of the numbering wheels by the actuator upon alternate rotations of the cylinder carrying said numbering wheels.

12. In a machine of the class described, the combination with a check issuing mechanism, of means for partially and wholly severing the check strip, and single means actuated during the operation of the issuing mechanism and the severing means for recording upon the partially severed portions of the strip characters for identifying the several portions of the wholly severed strip.

13. In a machine of the class described, the combination with a check issuing mechanism comprising a pair of feed rollers, of numbering type wheels carried by one of the rollers, means for rotating the rollers twice during the issuing of a single check and thereby number the check twice, means for feeding the type wheels upon alternate rotations of the rollers, and means for partially severing the check between the numbers thereon and wholly severing the strip after the number has been recorded the second time.

14. In a machine of the class described, the combination with a feeding mechanism for a check strip, an operating mechanism therefor, and a device positively actuated by the latter mechanism for partially and wholly severing said strip.

15. In a machine of the class described, the combination with a feeding mechanism for a check strip, an operating mechanism therefor, and a knife having a scalloped edge positively actuated by the operating mechanism for partially and wholly severing said strip.

16. In a machine of the class described, the combination with an operating mechanism, of a type carrier differentially adjusted thereby, means for taking duplicate impressions upon a check strip from said type carrier and for feeding the strip between impressions, and a knife positively actuated by the operating mechanism for partially severing the strip between the impressions and for wholly severing said strip beyond the last impression.

17. In a machine of the class described, the combination with a differentially adjustable type carrier, of an operating mechanism, means actuated thereby for taking duplicate impressions upon a check strip from said type carrier, and a knife positively actuated by the operating mechanism for partially severing the strip between the impressions and for wholly severing said strip beyond the last impression.

18. In a machine of the class described, the combination with a differentially adjustable type carrier, of an operating mechanism, means actuated thereby for taking duplicate impressions upon a check strip from said type carriers and for feeding the strip between impressions, a knife for partially severing the strip between impressions and for wholly severing said strip beyond the last impression, a rotating cylinder having numbering wheels mounted therein for the purpose of listing the partially severed portions of the check, a disk for actuating said numbering wheels and normally movable with said cylinder, and an arm for preventing movement of said disk upon alternate rotations of said cylinder and thereby actuating said numbering wheels.

19. In a machine of the class described, the combination with a differentially adjustable type carrier, of an operating mechanism, means actuated thereby for taking duplicate impressions upon a check strip from said type carrier and for feeding the strip between impressions, a knife for partially severing the check between impressions and for wholly severing said check beyond the last impression, a rotating cylinder having numbering wheels mounted therein for the purpose of listing partially severed portions of the check, a disk for actuating said numbering wheels and normally movable with said cylinder, a member rigid with said disk and having a projection, and an arm moved into the path of movement of the projection upon alternate rotations of the cylinder carrying said numbering wheels to prevent movement of said disk so that said disk will actuate the numbering wheels on continued movement of the cylinder.

20. In a machine of the class described, the combination with a check issuing mechanism comprising a pair of feed rollers, of numbering wheels carried by one of the rollers, an actuator for the numbering type wheels normally movable as a unit with said wheels, means for rotating the rollers twice during the issuing of a single check and thereby number the check twice, means for preventing movement of said actuator upon alternate rotations of the rollers to cause the actuator to operate the numbering wheels, and means for partially severing the check between the numbers thereon and wholly severing the check after the number has been recorded the second time.

21. In a machine of the class described, the combination with an amount entry retaining device, of a recording mechanism having means for taking a plurality of impressions upon a check strip of the amounts entered in the retaining device, operating mechanism therefor, and a single means actuated by said operating mechanism for weakening the strip between impressions and for severing the strip at a point beyond the rearmost impression.

22. In a machine of the class described, the combination with an accounting mechanism, of actuating means therefor, operating means for said actuating means, a type carrier differentially adjusted thereby, means for taking duplicate impressions upon a check strip of the amounts entered on the accounting mechanism from the type carriers, and a single means for partially severing the strip between the impressions and for wholly severing said strip after the last impression.

23. In a machine of the class described, the combination with an indicator and a type carrier, of differential mechanism for adjusting the same, means for taking duplicate impressions of the amounts indicated by the indicator upon a check strip from said type carrier and for feeding the strip between impressions, and a knife for partially severing the strip between the impressions and for wholly severing the strip beyond the last impression.

24. In a machine of the class described, the combination with an operating mechanism, of a totalizer, printing mechanism for taking duplicate impressions of the amounts entered on the totalizer upon a check strip and a knife for partially severing the strips between impressions and for wholly severing the strips beyond the last impression.

25. In a machine of the class described, the combination with an operating mechanism, of a totalizer, printing mechanism for taking duplicate impressions of the amounts entered on the totalizer upon a check strip, a knife for partially severing the strip between impressions and for wholly severing the strip beyond the last impression, and means also actuated by the operating mechanism for numbering the partially severed portions of the check strip.

26. In a machine of the class described, the combination with amount determining means, of an accounting mechanism controlled by said determining means, printing mechanism for taking a plurality of impressions upon a check strip of the amounts entered on the accounting mechanism and for feeding the strip between impressions, a knife for partially severing the strip between impressions and for wholly severing the strip beyond the last impression, and means for numbering the partially severed portion of the check strip.

In testimony whereof I affix my signature in the presence of two witnesses.

WOLDEMAR REINHOLD HEINITZ. [L. S.]

Witnesses:
SIDNEY RICHY,
M. J. BENNDARP.

Copies of this patent may be obtained for five cents each, by addressing the "Commissioner of Patents, Washington, D. C."